(12) United States Patent
Mao et al.

(10) Patent No.: US 10,567,816 B2
(45) Date of Patent: Feb. 18, 2020

(54) DELIVERING CONTENT

(71) Applicant: Comcast Cable Communications, LLC, Philadelphia, PA (US)

(72) Inventors: Weidong Mao, West Windsor, NJ (US); Robert Gaydos, Harleysville, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/142,769

(22) Filed: Apr. 29, 2016

(65) Prior Publication Data

US 2016/0323606 A1 Nov. 3, 2016

Related U.S. Application Data

(60) Provisional application No. 62/155,161, filed on Apr. 30, 2015.

(51) Int. Cl.
*H04N 21/2381* (2011.01)
*H04N 21/81* (2011.01)
*H04N 21/234* (2011.01)
*H04N 21/845* (2011.01)
*H04N 21/647* (2011.01)
*H04N 21/258* (2011.01)
*H04L 12/26* (2006.01)

(52) U.S. Cl.
CPC ... *H04N 21/2381* (2013.01); *H04N 21/23424* (2013.01); *H04N 21/25841* (2013.01); *H04N 21/64738* (2013.01); *H04N 21/812* (2013.01); *H04N 21/8455* (2013.01); *H04N 21/8456* (2013.01); *H04L 43/16* (2013.01)

(58) Field of Classification Search
CPC ........ H04N 21/2381; H04N 21/23424; H04N 21/25841; H04N 21/64738; H04N 21/812; H04L 43/16
See application file for complete search history.

(56) References Cited

U.S. PATENT DOCUMENTS

| | | | |
|---|---|---|---|
| 2008/0133767 A1* | 6/2008 | Birrer | H04L 65/4076 709/231 |
| 2011/0082946 A1* | 4/2011 | Gopalakrishnan | H04L 65/4084 709/231 |
| 2012/0144444 A1* | 6/2012 | Hunt | H04N 21/23439 725/115 |
| 2013/0091297 A1 | 4/2013 | Minder et al. | |

(Continued)

FOREIGN PATENT DOCUMENTS

WO 2013004260 A1 1/2013

OTHER PUBLICATIONS

Feb. 12, 2019—EP Search Report—EP 18208874.0.

*Primary Examiner* — Sumaiya A Chowdhury
(74) *Attorney, Agent, or Firm* — Banner & Witcoff, Ltd.

(57) ABSTRACT

Methods and systems are disclosed for delivery of one or more channels of programming in an IP network. An edge gateway device may retrieve segments of programming, based on information in a manifest file, and output the segments via multicast to one or more edge devices. Advertising content may be inserted, or replaced if already present, before the segments are multicast. Segments encoded at various bit rates may be available for retrieval. Segments may be selected for retrieval based in part on a quality indicator associated with each segment.

21 Claims, 8 Drawing Sheets

(56) References Cited

U.S. PATENT DOCUMENTS

| | | | |
|---|---|---|---|
| 2014/0019635 A1 | 1/2014 | Reznik et al. | |
| 2014/0150019 A1* | 5/2014 | Ma | G06Q 30/0251 |
| | | | 725/34 |
| 2014/0355603 A1* | 12/2014 | Li | H04L 12/184 |
| | | | 370/390 |
| 2015/0288617 A1* | 10/2015 | Dasher | H04L 47/801 |
| | | | 709/226 |
| 2015/0381686 A1* | 12/2015 | Hurst | H04N 21/23439 |
| | | | 709/231 |
| 2016/0044080 A1* | 2/2016 | DuBreuil | H04L 65/4076 |
| | | | 709/219 |
| 2016/0088054 A1 | 3/2016 | Hassan et al. | |

* cited by examiner

DELIVERING CONTENT

CROSS REFERENCE TO RELATED APPLICATIONS

This application claims priority to U.S. Provisional Patent Application Ser. No. 62/155,161, filed Apr. 30, 2015 and entitled DELIVERING CONTENT, the contents which are hereby incorporated by reference in its entirety for all purposes.

BACKGROUND

Current information delivery networks often include separate networks optimized for the delivery of video on demand (VOD) content and for the delivery of linear programming, such as a real time or broadcast television. The VOD networks are typically IP networks, optimized for HTTP adaptive streaming, in order to deliver video programs to client devices upon request. In contrast, linear programming is typically delivered via a network optimized for IP multicast of large files. The networks used for multicast distribution of linear programming may need to be secured to prevent reception by unauthorized users. In some types of networks, the information may be delivered to edge devices which perform modulation, for example quadrature amplitude modulation (QAM), for delivery to gateway interface devices, such as set top boxes.

The use of these separate networks incurs a cost to the network provider for hardware and maintenance, and increases the complexity of network operations. In addition, operating multiple types of networks makes it difficult to efficiently utilize available network bandwidth.

It would be an improvement in operating cost and efficiency if these and other services could be packaged more efficiently, taking into account real time network conditions, and offered over a simplified network.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In some aspects of the disclosure, an edge gateway device in an information delivery network may retrieve content from a server and provide the content to an edge device. In some embodiments, the content may be available as segments of media encoded at various bit rates, each having an associated quality indicator. In an embodiment, the edge gateway device may select a segment for providing to the edge device, based in part on the quality indicator. In some embodiments, the edge gateway device may select a segment for providing to the edge device, based in part on bandwidth available in the network path to the edge device.

In aspects of the disclosure, the content may be linear programming content, such as one or more linear channels. In other aspects, the content may be non-linear, such as VOD content. A manifest file may provide pointers, such as URLs, for locating segments of the content for retrieval. In some aspects, information about the quality of the encoded content may be included in the manifest file and this information may be used in determining the segments to retrieve.

In some embodiments, one or more content segments may be replaced with locally available segments, such as local commercial advertising.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
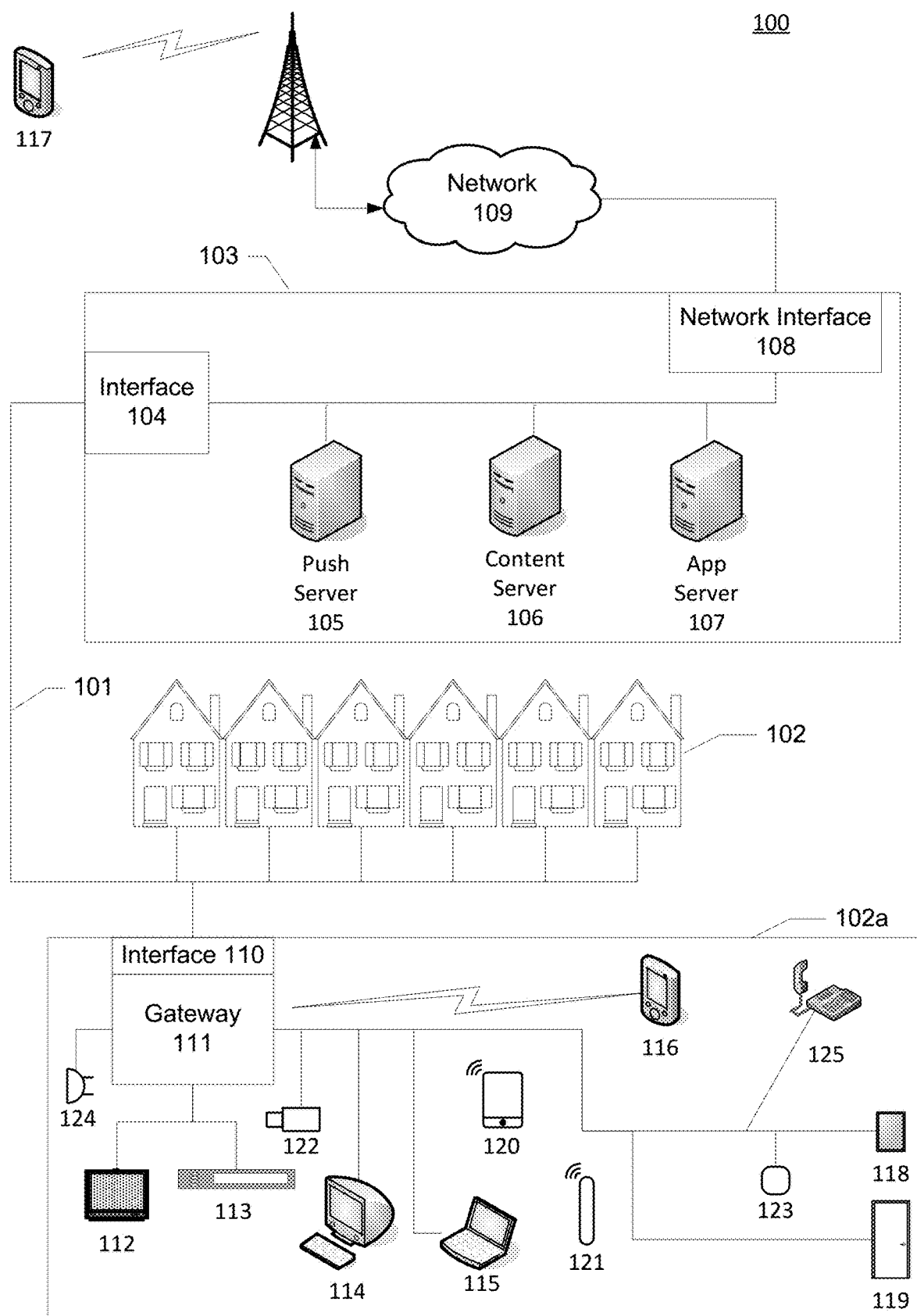
FIG. 1 illustrates an example information access and distribution network in accordance with one or more aspects as described herein.

FIG. 1 illustrates an example information distribution network 100 on which many of the various features described herein may be implemented. The network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS), for example a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding wireless devices 117 (e.g., smart phones).

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in the homes. This content may be, for example, video on demand movies, television programs, songs, audio, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Red Hat Linux, HTML5, JavaScript, AJAX and COMET). For example, an application server may be responsible for collecting television program listings information and generating a data download for electronic program guide listings. Another application server may be responsible for monitoring user media habits and collecting that information for use in selecting advertisements. Another application server may be responsible for formatting and inserting advertisements in a video stream and/or content item being transmitted to the premises 102. It should be understood by those skilled in the art that the same application server may be responsible for one or more of the above listed responsibilities.

An example premises 102a may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway interface device 111 may be a set-top box (STB), digital video recorder (DVR), computer server, or any other desired computing device. The gateway interface device 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 125, window security sensors 118, door home security sensors 119, tablet computers 120, personal activity sensors 121, video cameras 122, motion detectors 123, microphones 124, and/or any other desired computers, sensors, and/or other devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
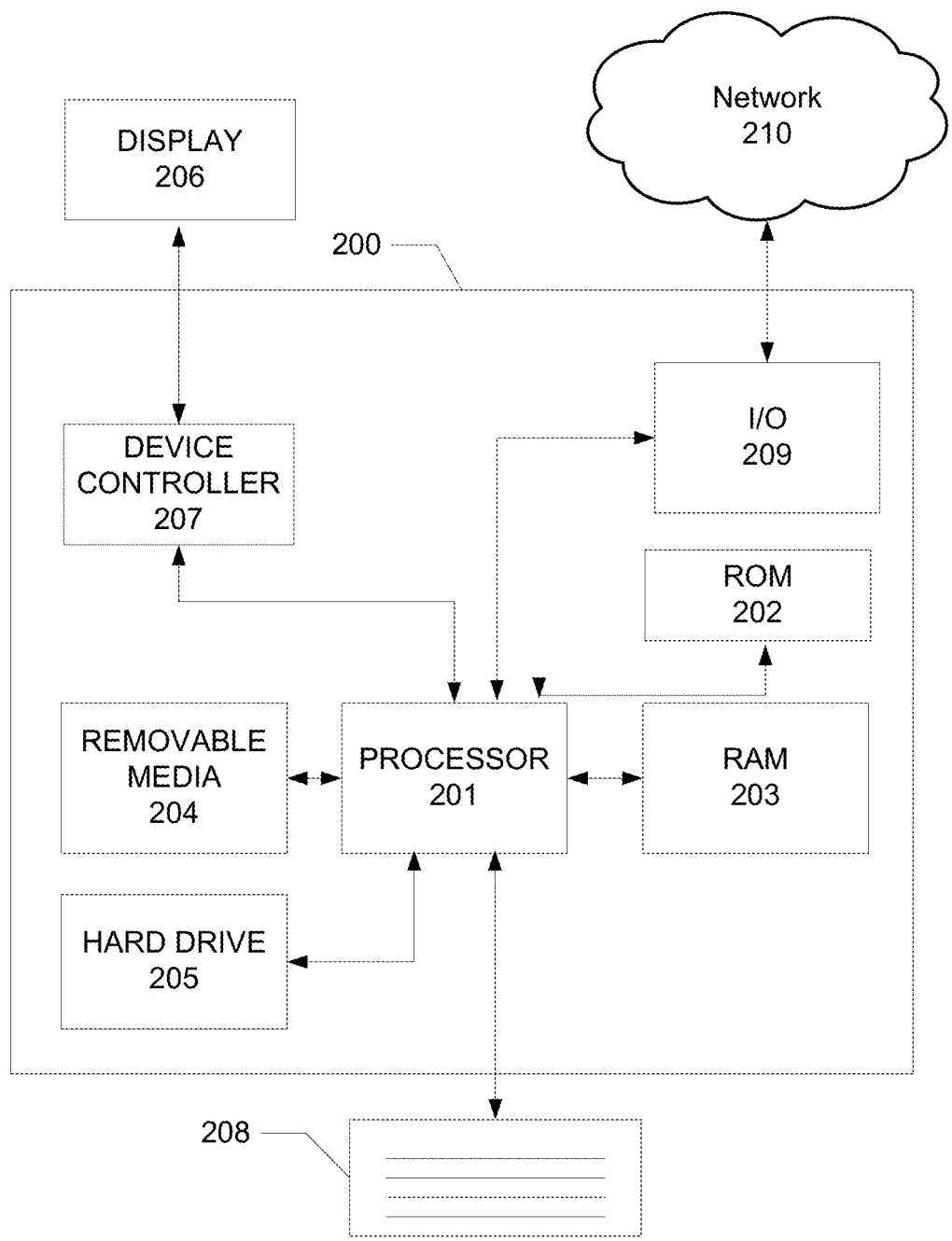
FIG. 2 illustrates an example computing device that may be used to implement any of the features and devices described herein.

FIG. 2 illustrates general hardware elements of an example computing device 200 that can be used to implement any of the elements discussed herein and/or illustrated in the figures. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.)

may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

Figure 3:
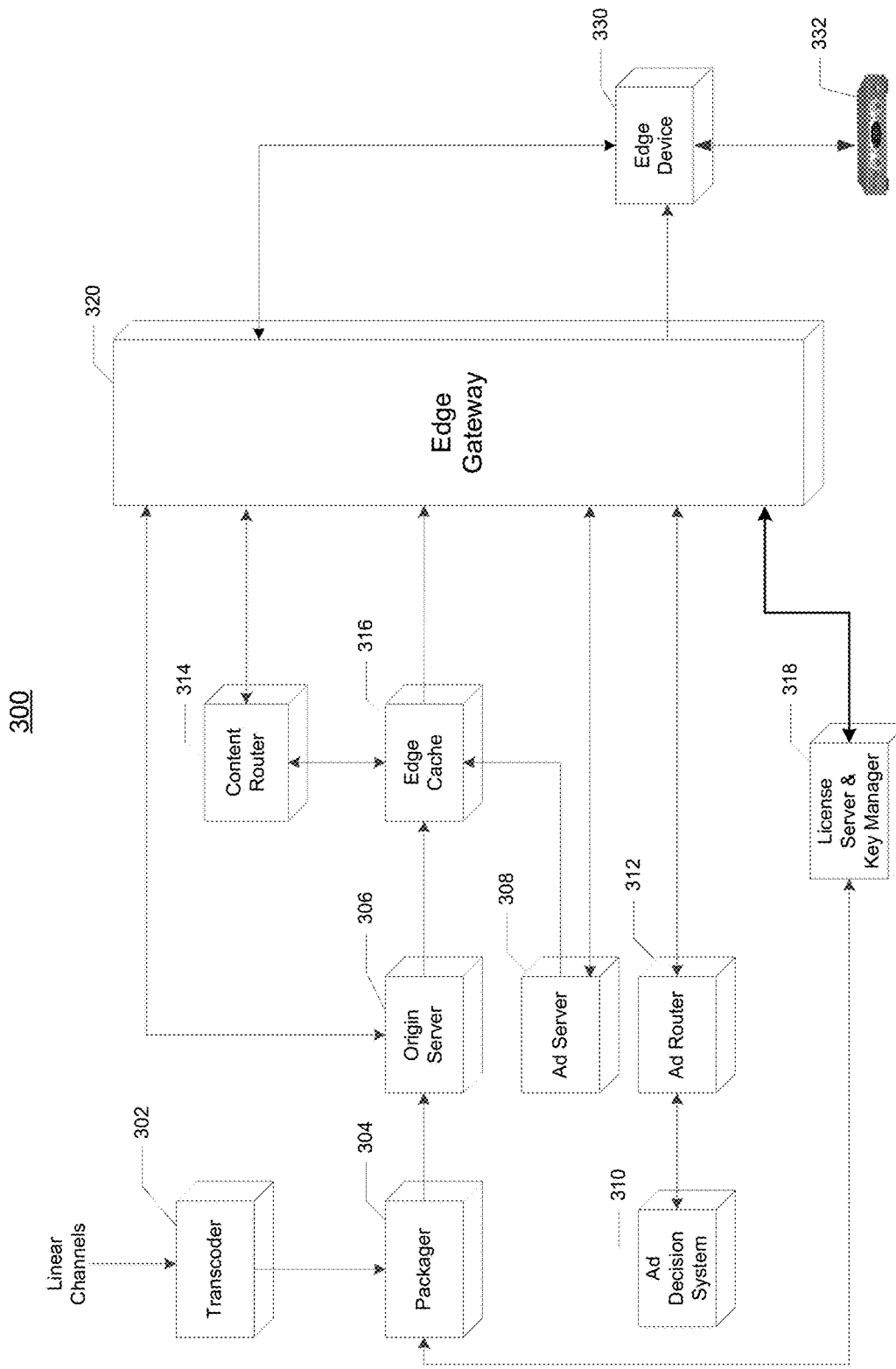
FIG. 3 illustrates an example network configuration in accordance with one or more aspects as described herein.

FIG. 3 illustrates an example network configuration 300 in accordance with one or more aspects as described herein. In some embodiments, channels or other programming may be received at transcoder 302, for example, by wired or wireless means. For example, channels may be received via one or more antennas, receivers or via a cable such as a coaxial cable. In some embodiments, transcoder 302 may transcode the channels into encoded streams of digital data according to the MPEG-4 standard. For example, transcoder 302 may perform adaptive bit rate (ABR) MPEG-4 transcoding. In some embodiments, transcoder 302 may provide an encoding function, for example, when a channel is received as an analog channel. In some embodiments, the transcoder may provide multiple encoded streams for a particular channel. For example, the transcoder may output three streams of data for a particular channel, where each stream may have a different bit rate encoding. Continuing the example, the transcoder may output encoded streams having bit rates of 6250 kbps, 3480 kbps and 1663 kbps, for example. Those skilled in the art will realize that any number of streams may be output by the transcoder for a particular channel, and the content of a channel may be encoded at various bit rates.

In some embodiments, the bit rate used for encoding by the transcoder 302 may depend on the type of content or a quality of the content. In other examples, the bit rate may be selected based on the intended use of the resulting encoded content. For example, various bit rate encodings may be used to create streams of content appropriate for presentation on a range of devices, including the wireless devices 116 and televisions 112 of FIG. 1. A channel may include audio and video content. Audio and video content may be encoded at the same bit rate or they may be encoded at different bit rates.

One or more of the encoded streams output by the transcoder 302 may be provided to a packager 304. In some embodiments, the packager 304 may package one or more encodings of a transcoded channel according to the Dynamic Adaptive Streaming over HTTP (MPEG-DASH) specification. In some embodiments, the packager 304 may divide an encoded stream into segments of equal play time, for example, 2 second segments, and provide the segments to an origin server 306 for storage and for retrieval by the edge gateway 320. The number of bits in any segment may depend on the bit rate encoding used by the transcoder in creating the stream. For any channel, segments may be created of each bit rate encoded stream.

The packager 304 may create a manifest file, also be referred to as a media presentation description (MPD) file, which may provide segment information, including one or more pointers, such as URLs, that indicate access locations for the segments, including segments from each bit rate encoded stream. In some embodiments, the packager 304 may associate a quality indicator with each segment and include the quality indicator in the manifest file as segment information, for example as metadata, such as by use of the Extensible Markup Language (XML) standard. The quality indicator may provide an indication of the quality of the video encoding of a segment and may be determined based on the scene complexity of the segment and the encoding bit rate of the segment. A more complex scene may require a higher bit rate encoding in order to maintain a particular level of quality. For example, a fast motion sports scene may require a higher bit rate encoding in order to have the same level of quality as a segment containing little motion. In other embodiments, an indicator indicative of a scene complexity, such as a complexity score, may be provided instead of the quality indicator. In these embodiments, the complexity score may be associated with a portion of content or with the media encodings of the portion of content. A quality indicator, or a quality value representative of the quality level, may be determined for the portion based on the complexity score and the bit rate associated with the encoding of the portion (e.g. one or more segments).

In various embodiments, the quality indicator may be represented by a numeric value, for example, ranging from 1 to 10 or 1 to 100, or any other numeric or alphanumeric range. For example, a quality indicator of 1 may indicate a low quality encoding while a quality indicator of 100 may indicate a high quality encoding.

In some embodiments, the packager 304 may determine the quality of one or more segments by analyzing the content of the segments. In other embodiments, the transcoder 302 may determine the quality of various portions of a content stream and provide information about the quality to the packager 304. For example, the transcoder 302 may provide quality indicators and timing data to inform the packager 304 about changes in the quality level that may occur at certain timing points in a particular encoding of a content stream and the packager 304 may use the information when generating the manifest file. In some embodiments, the transcoder 302 may provide complexity scores and timing data related to the content to the packager 304 for use in determining quality indicators to associate with various portions of the content. In still other embodiments, a computing device may perform portions of the transcoding and packaging functions and may determine the quality indicators for various segments as they are encoded and the segments are created.

The manifest file and segments may be stored on an origin server 306 for retrieval. In some embodiments, the manifest file may be updated continuously as the encoded streams are received by the packager 304 and segments are created, and the edge gateway 320 may fetch the manifest file repeatedly, in order to retrieve the latest information, such as the location of the most recently created segments.

In some embodiments, more than one manifest file may be created by the packager for a particular channel. For example, the packager may create a manifest file for a channel that may carry a sports program which may not be allowed to be provided to a particular region. For example, a baseball game may be blacked out in the city where the game is being played. In such examples, the packager 304 may create a second manifest, based on an alternate channel, to provide alternate content to the blacked out region. In other embodiments, a manifest file may be modified by another device, for example, an origin server may modify a manifest file in order to provide a particular modification, such as for providing alternate content, including different advertisements.

A client device, for example, a DASH client, may obtain access information for the segments from the manifest file. In some embodiments, a client device may select among the various bit rate encoded segments for any particular time period. It should be understood by those skilled in the art that the segments, once created by the packager 304, may be stored or cached at various places in the network (for example, at edge cache 316, or at content router 314) in order to provide various benefits, such as to increase the efficiency of the network.

In some embodiments, the processes of encoding and packaging may occur without request from another device. In other embodiments, the processes may occur responsive to a request for a channel or other content from another device. In some embodiments, the segmenting of the transcoded channel by the packager may be done in a "just in time" manner where any time delay between the reception of the encoded stream and the output of the segments is minimized.

In some embodiments, segments created by the packager 304 may be encrypted before storing. In these embodiments, a license server and key manager 318 may provide encoding keys, decoding keys or a license for use of the content.

In some embodiments, an ad server 308 may provide storage for advertisements to be used in conjunction with the channel. The advertisements may be stored as segments, for example, as 2 second segments of content, and each segment may have a quality indicator associated with the segment. The manifest file created by the packager 304 may provide URLs, or other pointers, pointing to advertisements stored on the ad server 308 and the manifest file may include an indication of the quality of each segment. As is known by those skilled in the art, a channel may include a time slot or otherwise an allowance of time in which advertisements may be inserted without harming the viewing experience. For example, it is well known for a sporting event to pause the action to allow for a commercial break. Indicators for the commercial breaks may be detected by the packager 304 and advertisements may be inserted during the time provided for the commercial break.

One or more edge gateways 320 may request channel content of one or more channels. In some embodiments, the edge gateway 320 may request content, without receiving a request for the channel from an edge device. For example, the edge gateway 320 may be configured to request certain content, such as a national broadcast network linear channel, without receiving a request for the content from an edge device. In other embodiments, the edge gateway 320 may request content in response to receiving a request for the channel from an edge device 330.

The edge gateway 320 may request content through the use of HTTP streaming, for example, by making requests conforming to the MPEG DASH specification. According to the MPEG-DASH specification, an MPEG-DASH content server may provide a list of available segment URLs in a Media Presentation Description (MPD) manifest file, requested by a DASH client. The DASH client may then request the segments using the URLs from the MPD file as required in order to provide playback of the media content.

In some embodiments, the edge gateway 320 may locate an origin server 306 providing content for a particular channel by use of a DNS (Domain Name System) lookup. For example, a national television network channel may have one or more origin servers 306 storing content of the channel. In some embodiments, the edge gateway 320 may perform a DNS lookup using a name of the channel in order to locate an origin server 306. In some embodiments, the edge gateway may be pre-configured with origin server access information. In such embodiments, the edge gateway may access the origin server without a DNS lookup.

In some embodiments, the edge gateway may request a manifest file for a particular channel. Since the manifest file for channels may be updated continuously, the edge gateway 320 may fetch the manifest file repeatedly, for example, at timed intervals, in order to retrieve a version with updated information. The timed interval may be based on the elapsed time since the previous fetch or it may be based on information contained within the manifest file itself, for example, a fetch frequency or an interval to the next fetch of the manifest file.

In some embodiments, the manifest file may contain links or pointers to segments of the content of the channel at various bit rate encodings. Once the edge gateway has retrieved the manifest file, pointers, such as URLs, for a various content segments may be read from the manifest file. The edge gateway 320 may request one or more of the content segments. Upon receipt of the content segment(s), the edge gateway may transmit the segments via IP multicast, IP unicast, or broadcast to one or more edge devices 330. In some embodiments, the edge gateway may defragment or otherwise assemble the content segments into one or more content streams before transmitting the content to the edge devices 330.

In some embodiments, the edge gateway 320 may perform decryption of received content. For example, if the manifest file or content segments have been encrypted during the packaging process, the edge gateway 320 may decrypt them. Any license or decryption keys may be retrieved by the edge gateway from a license server and/or a key manager 318.

In some embodiments, the manifest file may contain information about advertising segments. In such embodiments, the edge gateway may parse the manifest file and choose among alternate advertisement segments. For example, the manifest file may contain URLs or other pointers pointing to content of a number of advertisements, each appropriate for a different geographical region. The edge gateway 320 retrieve one or more of the advertisements for the region in which the edge gateway 320 is located or for the one or more regions served by the edge gateway 320.

After retrieving the content, the edge gateway 320 may manipulate the content. For example, if the received content is encrypted, the edge gateway may decrypt the content before performing packet replacement or before sending the content to one or more edge devices 330. In various embodiments, the edge gateway 320 may add segments or remove or replace segments of the content before transmitting the segments to an edge device 330. For example, it may be determined that one or more segments may be replaceable with segments containing locally appropriate information, such as a local advertisement. In some embodiments, the received content may contain information indicating the position of an advertisement and the edge gateway 320 may replace segments of the advertisement with segments of a local advertisement. In other embodiments, the received content may contain an ad boundary indicator which may indicate a segment insertion opportunity where one or more segments may be added by the edge gateway 320, for example to introduce a local advertisement or other content, depending on the embodiment. In some embodiments, the manifest file may include a boundary marker or other indication that a segment may have been omitted. In some embodiments, the edge gateway may communicate with another device, such as ad router 312 in communication with the ad decision system 310, in order to receive advertisements in order to insert the local advertisement into the content, for example, at the position marked by the boundary marker or in a position where a segment has been omitted. In some embodiments, the edge gateway may retrieve an advertisement directly from an advertising server. In various embodiments, the advertisements may be regional advertisements, local or national advertisements. It should be understood that while the examples presented may relate to the replacement of advertisements, any other content may be replaced using the methods disclosed herein.

In some embodiments, the edge gateway may fetch segments from all channels that may be offered to the edge devices 330 to meet the needs of users served by those edge devices. For example, if a particular edge device 330 provides content to a number of users and the union of channels available to those users is a particular set, then the edge gateway 320 may fetch segments for each of the channels in the set and transmit them to the edge device 330 for subsequent transmission to the gateway interface device 332, located at a user premises, such as the user premises 102a of FIG. 1. In other embodiments, the edge device 330 may communicate information to the edge gateway 320 about a subset of channels being watched or otherwise consumed by users or devices at a user premises and the edge gateway 320 may fetch segments for only those channels, for example, in order to conserve network bandwidth.

In embodiments in which multiple edge gateways 320 are provided in a network, each edge gateway 320 may fetch different segments based on the channels required by the users associated with edge devices served by the edge gateway 320.

In some embodiments, the edge gateway 320 may determine to retrieve content of particular channels based on information received from a gateway interface device 332, an edge device 330 or from another device in the networks 100 or 300.

In some embodiments, the edge devices 330 may receive streams of content segments over UDP/IP and transmit/modulate the received streams onto frequency channels to devices at user premises, such as a gateway interface device 332. For example, the edge device 330 may perform re-multiplexing and modulation of the received content segments as an MPEG-2 Multiple Program Transport Stream (MPTS) over QAM. The gateway interface device 332 may be tuned to the channel, for example, by a user, in order to receive the content of the channel.

In some embodiments, the edge gateway 320 may perform a statistical multiplexing function, for example, to manage bandwidth on the network or communication pathway between the edge gateway 320 and one or more edge devices 330. The edge gateway 320 may determine a utilization of the network between the edge gateway 320 and the edge devices 330 and use the result of the determination in deciding which of the various bit rate encoded content segments to fetch and transmit to the edge devices 330. The edge gateway 320 may use information in a manifest file during statistical multiplexing. In some embodiments, the manifest file may contain a segment manifest, showing bit rates and segments sizes of various segments. Using the information in the manifest file, the edge gateway 320 may perform statistical multiplexing, choosing among various segment sizes and segment bit rates. In some embodiments, the edge gateway 320 may request multiple versions of a segment before determining which of the multiple versions to provide to the edge devices 330. In other embodiments, the edge gateway 320 may retrieve a single version of a content segment.

In various embodiments, the segment sizes chosen by the edge gateway 320 may vary within a channel and/or the segment sizes may be different among different channels. For example, segments of one bit rate encoding may be chosen for a period of time on one channel and segments of a second bit rate encoding may be chosen during a later period. During either period of time, segments chosen for another channel may or may not have the same bit rate encoding.

In some embodiments, the edge gateway 320 may determine to retrieve and transmit segments of content from various channels in order to manage the quality of content distributed to one or more edge devices 330 while staying within a determined network or communication pathway bandwidth threshold. This may be referred to as Adaptive Bit Rate multiplexing (ABR multiplexing). In ABR multiplexing, the edge gateway 320 may determine a quality level to be used in outputting content and select segments for retrieval and distribution having the determined quality level. In some embodiments, segments of a content stream may be selected to maintain a particular quality level. For example, segments may be selected based in part on the quality identifier so that a constant level of quality may be maintained throughout distribution of a content item and/or channel. This may lead to the retrieval and transmission of segments having differing bit rate encodings. For example, for a particular quality level, segments containing encoded video of more complex scenes may have a higher bit rate encoding while segments containing encoded video of less complex scenes may have a lower bit rate encoding.

In some embodiments, the ABR multiplexing function may be based in part on the utilization, or an expected utilization, of a communication pathway between the edge gateway 320 and the edge devices 330. For example, if it is determined that the bandwidth utilization of the communication pathway has reached a threshold, edge gateway 320 may retrieve and transmit segments having a lower quality in order to reduce the bandwidth utilization of the communication pathway. In various embodiments, a lower quality level may be determined for retrieval and transmission of segments of a particular content item or channel, for a particular user, or for a particular geographic region associated with intended recipients of the segments. For example, it may be determined that certain channels are popular in particular geographic regions and those channels may be maintained at a higher quality level while others may be reduced.

In some embodiments, the edge gateway 320 may retrieve and transmit segments based in part on information indicative of the scene complexity associated with a portion of content. If it is determined that the portion of content has a high scene complexity, then a segment having a higher bit rate encoding may be retrieved and transmitted. If it is determined that the portion of content has a low scene complexity, then a segment having a lower bit rate encoding may be retrieved and transmitted. In this manner, the communication pathway bandwidth, for example on an output network, may be efficiently utilized without negatively impacting the user experience.

Various methods may be used to determine, in order to conserve bandwidth on an output network, which content segments may be distributed with lower quality and which may be distributed with higher quality. In some embodiments, all content segments being distributed may be distributed at a lower quality level. In other embodiments, a popularity of one or more content items may be determined and less popular content items may be distributed with a lower quality level than the quality level used for distributing more popular content items. For example, if it is determined that a large number of users are consuming a first program while a small number of users are consuming a second program, the edge gateway 320 may determine to retrieve and transmit segments of the second program with a lower quality level as compared to the quality level of the segments of the first program.

In some embodiments, the decision as to what quality level is determined for a particular program may depend on various other factors, including the type of the program, the title of the program, the genre of the program, whether or not the program contains live content, viewing statistics of the program, or it may depend on a service level agreement associated with a particular user.

In some embodiments, ABR multiplexing may be used to enable the output network to carry more channels or program streams. For example, if the edge gateway 320 is distributing a number of programs at a maximum quality level based on the network utilization, and if it is determined that another program should be distributed, then the edge gateway 320 may reduce the quality of one or more programs in order to allow the additional program to be distributed via the network.

In some embodiments, edge gateway 320 may retrieve and transmit segments of advertisements having the same quality level as the program in which they interrupt or edge gateway 320 may retrieve and transmit segments of advertisements having a quality level different from that of the program. In some embodiments, edge gateway 320 may retrieve and transmit segments of advertisements having various quality levels, based on the network utilization.

In some embodiments, the edge device 330 may join one or more multicast groups in order to receive content segments from the edge gateway 320. The edge device 330 may receive content segments associated with various channels. The edge device 330 may modulate the data of the content segments and transmit them for reception by a QAM tuner or any other type of tuner, such as may be provided by gateway interface device 332, which may correspond to the gateway interface device 111 of FIG. 1.

In some embodiments, edge device 330 may be configured to send a request for a channel to the edge gateway 320. In some embodiments, the gateway interface device 332 may send a request to the edge device 330 for a particular channel. For example, a user may tune the gateway interface device 332 to a particular channel to watch programming. In response, the gateway interface device 332 may communicate with the edge device 330 to inform it about the channel requested by the user. In response, the edge device 330 may communicate with the edge gateway 320 to inform it that a particular channel has been requested.

In some embodiments, a network may be simplified by the addition of an edge gateway 320. In some embodiments, existing edge devices 330 may not need to be modified when an edge gateway 320 is introduced into the network. For example, when existing edge devices 330 have been configured to receive streaming content via one or more multicast groups, the edge gateway 320 may be configured to transmit the content to those same multicast groups.

Figure 4:
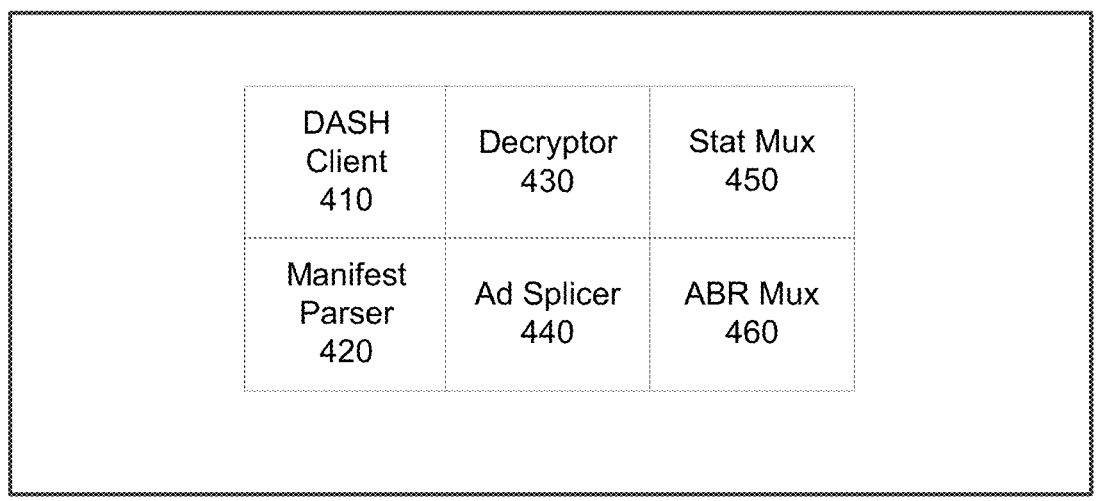
FIG. 4 illustrates an example edge gateway in accordance with one or more aspects as described herein.

FIG. 4 illustrates an example functional depiction of an edge gateway 400 in accordance with one or more aspects as described herein. The edge gateway 400 may comprise a number of components or functions. For example, the edge gateway 400 may include a DASH client 410 for retrieving manifest files and segments of content from an origin server 306.

The edge gateway 400 may include a manifest parser 420 for parsing and/or manipulating a manifest file. In some embodiments, the manifest file may be parsed to determine segment access information, segment bit rate encoding values, segment quality indicators, scene complexity scores and other information about content segments. In some embodiments, information associated with locating advertisement boundaries may be parsed from a manifest file. For example, this information may be used to enable replacement of an advertisement or insertion of an advertisement at the appropriate position in an output stream.

The edge gateway 400 may include a decryptor 430. The decryptor may decrypt segments that have been previously encrypted. Decrypted segments may be manipulated or replaced with alternate segments before the transmission of the segments by the edge gateway. In some embodiments, the decrypted segments may be encrypted before transmission of the segments by the edge gateway. License server & key manager 318 may be communicated with in order to obtain credentials for use in decrypting or encrypting a segment.

Ad splicer 440 may insert, remove or replace advertisements, for example, as segments of content. In some embodiments, a local advertisement may be added to the output stream, for example, in a position marked for ad insertion, as indicated in a manifest file. In another embodiment, a received segment may be discarded and replaced with a segment obtained from another source, such as from an ad router 312 or ad server 308. In some embodiments, the segment obtained from another source may be a portion of a local advertisement.

The edge gateway 400 may include a stat mux 450 (statistical multiplexor) for managing network utilization on the output network between the edge gateway 320 and devices receiving content segments from the edge gateway 320, for example, edge devices 330 or gateway interface devices 332. The stat mux 450 may determine a condition of the output network and cause the edge gateway 320 to select segments sized to relieve or prevent congestion on the output network. For example, if the stat mux 450 determines that the output network has or may reach a bandwidth utilization threshold, the stat mux 450 may cause the edge gateway, for example via communication with the DASH client 410, to select segments encoded with a lower bit rate.

The edge gateway 400 may include an ABR mux 460 (adaptive bit rate multiplexor) for managing quality of distributed content and/or network utilization on the output network between the edge gateway 320 and devices receiving content segments from the edge gateway 320, for example, edge devices 330 or gateway interface devices 332. The ABR mux 460 may determine a quality level for segments of content and may cause the retrieval and transmission of segments having the determined quality level. In some embodiments, a condition of the output network may cause the edge gateway 320 to select segments having a lower quality level, in order to relieve or prevent congestion on the output network. For example, if the ABR mux 460 determines that the output network has or may reach a bandwidth utilization threshold, the ABR mux 460 may cause the edge gateway 320, for example via communication with the DASH client 410, to select segments having a lower quality.

Figure 5:
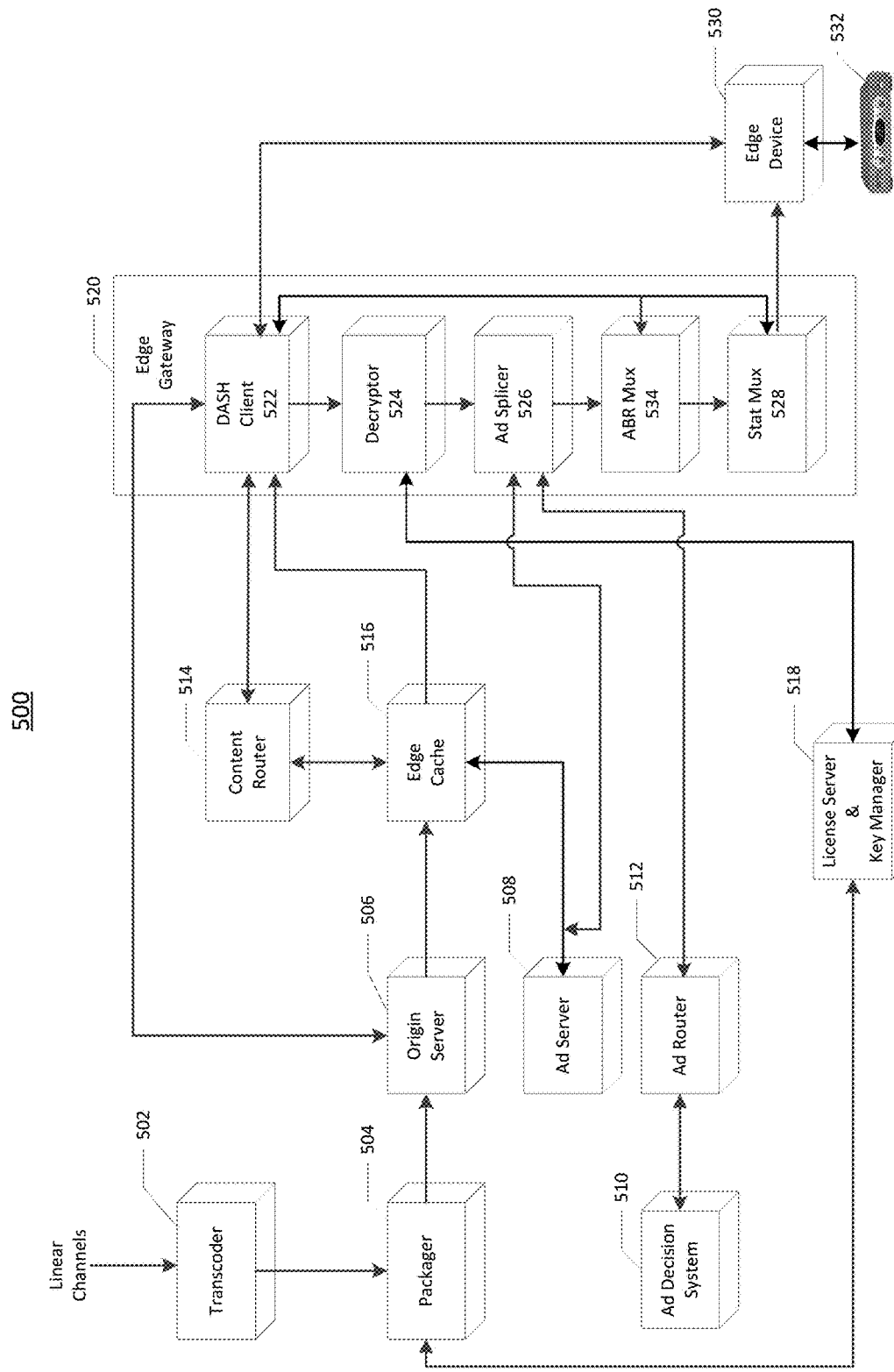
FIG. 5 illustrates an example edge gateway configuration in an example network in accordance with one or more aspects as described herein.

FIG. 5 illustrates an example edge gateway 520 configuration in example network 500 in accordance with one or more aspects as described herein. In the example shown, channels may be received at transcoder 502, which may transcode the channels each into one or more encoded streams of digital data according to the MPEG-4 standard.

Each of the one or more encoded streams output by the transcoder 502 may be provided to a packager 504 which may package the one or more encoded streams according to the Dynamic Adaptive Streaming over HTTP (MPEG-DASH) specification and create a manifest file and segments for each channel. In some embodiments, the packager 504 may associate a quality indicator with each segment and include the quality indicator in the manifest file, for example as metadata, such as by use of the XML standard. The manifest file and segments may be stored at an origin server 506. The manifest file and segments may be subsequently cached at edge cache 516, or at content router 514. In some embodiments, segments created by the packager may be encrypted before storing, using information provided by license server and key manager 518. In some embodiments, the manifest file created by the packager 504 may provide pointers, such as URLs, pointing to advertisements stored on ad server 508.

One or more edge gateways 520 may request the channel content. In some embodiments, the edge gateway 520 may receive a request for content, or a request for a channel, from an edge device 530. In some embodiments, a DASH client 522, of edge gateway 520, may obtain access information for segments of a channel from the manifest file. The DASH client 522 may request content through the use of HTTP streaming, for example, by making requests conforming to the MPEG DASH specification. In some embodiments, the DASH client 522 may select among various bit rate encoded segments for any particular time period of channel content. The selection of the various segments may be in response to information provided by other components of the edge gateway 520, such as in response to information provided the stat mux 528 or the ABR mux 534. In various embodiments, content segments and/or manifest files requested by DASH client 522 may be retrieved from origin server 506, edge cache 516, or content router 514.

In some embodiments, content received by DASH client 522 may be provided to decryptor 524 to perform decryption of received content. For example, if the manifest file or content segments have been encrypted during the packaging process, decryptor 524 may decrypt them. Any required license or decryption keys may be retrieved by the edge gateway from license server and key manager 518.

In various embodiments, ad splicer 526 may remove or replace segments of the content. For example, one or more advertisement segments may be replaced with alternate advertisement segments. In some embodiments, ad splicer 526 may communicate with ad router 512 or ad decision system 510, in order to receive advertisements. In some embodiments, the manifest file may contain information about the locations of advertising segments. In such embodiments, a manifest parser (for example, manifest parser 420, of FIG. 4) may parse the manifest file to determine an advertisement segment location.

Segments of content may be provided to ABR mux 534, which may monitor the quality level and may receive information about the bandwidth utilization on the communication pathway between the edge gateway 520 and the edge devices 530. ABR mux 534 may perform an ABR multiplexing function to cause the DASH client 522 to select segments of particular quality levels, as described above. In some embodiments, the ABR mux 534 may cause the DASH client to select segments having a particular quality identifier or a particular scene complexity and bit rate encoding.

Segments of content may be provided to stat mux 528, which may transmit the segments via IP multicast, unicast or broadcast to one or more edge devices 530. Stat mux 528 may perform a statistical multiplexing function to manage bandwidth on the network between the edge gateway and one or more edge devices 330. For example, the stat mux 528 may determine a utilization of the communication pathway between the edge gateway 520 and the edge devices 530 and provide information to DASH client 522 for use in deciding which of the various bit rate encoded content segments to fetch, when multiple bit rate encodings are available.

Upon reception of content segments, the edge device 530 may modulate the data of the content segments and transmit the data for reception by a QAM tuner, or any other type of tuner, such as may be provided by gateway interface device 532, which may correspond to the gateway interface device 111 of FIG. 1.

Figure 6:
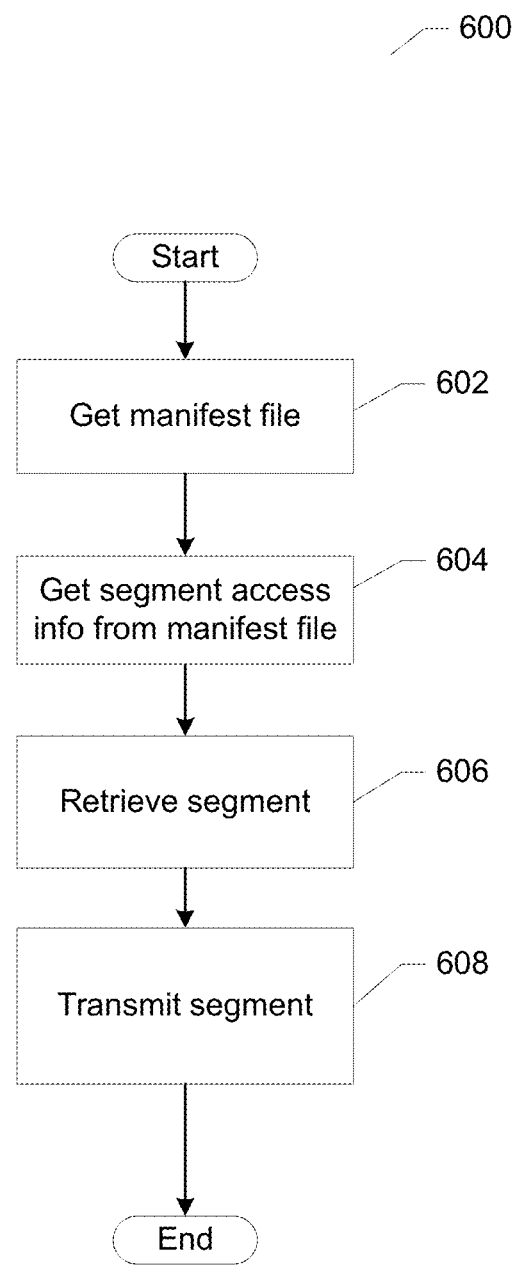
FIGS. 6-8 are example flow charts illustrating methods performed in accordance with one or more aspects as described herein.

FIG. 6 is an exemplary flow diagram illustrating an example method 600 in accordance with one or more disclosed features described herein. In one or more embodiments, the method illustrated in FIG. 6 and/or one or more steps thereof may be performed by one or more computing devices (e.g., edge gateway 320, gateway interface device 111, set-top box 113, interface 110, and the like). In other embodiments, the method illustrated in FIG. 6 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 602, a manifest file may be retrieved, for example, by edge gateway 320. As described above, the method of FIG. 6 may be performed by various devices. An edge gateway 320 will be used in the following description in order to ease understanding by the reader. In some embodiments, the manifest file may represent access information associated with segments for a particular program. In some embodiments, the edge gateway may have been configured to retrieve one or more manifest files. In some embodiments, the edge gateway may receive a request for a particular channel and the retrieval of the manifest file may be responsive to the request.

At step 604, the edge gateway may retrieve one or more segments, based on information in the manifest file. For example, the manifest file may contain pointers, such as URLs, which point to segments of encoded content of a channel. In some embodiments, for any content segment, the edge gateway may retrieve one or more segments with various bit rate encodings and/or quality levels, as indicated in the manifest file.

In some embodiments, a particular bit rate encoded segment may be selected for retrieval based on a network condition between the edge gateway and the location from where the segment is to be retrieved from. For example, if the network is experiencing congestion, a segment with a lower bit rate encoding may be selected because it may be retrieved more quickly and may help keep the flow of information to a viewer. In other embodiments, a particular bit rate encoded segment may be selected for retrieval based on a network condition between the edge gateway 320 and the edge device 330. For example, if the utilization of the communication pathway between the edge gateway 320 and the edge device 330 has reached a threshold, a segment with a lower bit rate encoding may be retrieved because it may require less bandwidth when transmitted via the communication pathway.

In some embodiments, a segment having a particular quality level, for example, as indicated by a quality indicator in the manifest file, may be selected for retrieval based on a network condition between the edge gateway 320 and the location from where the segment is to be retrieved from. In other embodiments, a segment having a particular quality level may be selected for retrieval based on a network condition between the edge gateway 320 and the edge device 330. For example, if the utilization of the communication pathway between the edge gateway 320 and the edge device 330 has reached a threshold, a segment with a lower quality level may be retrieved. Selection of segments with a lower quality level may conserve communications bandwidth while maintaining a quality of the content itself, for example, a resolution of a video program may be maintained at a level acceptable to a user.

At step 606, the selected segment may be retrieved. In some embodiments, the segment may be retrieved from an origin server by use of an HTTP GET message.

At step 608, the segment may be transmitted, for example, by multicasting the segment to a pre-configured multicast address. In some embodiments, the segment may be transmitted by broadcasting the segment to a broadcast address. In other embodiments, the segment may be transmitted via unicast.

Figure 7:
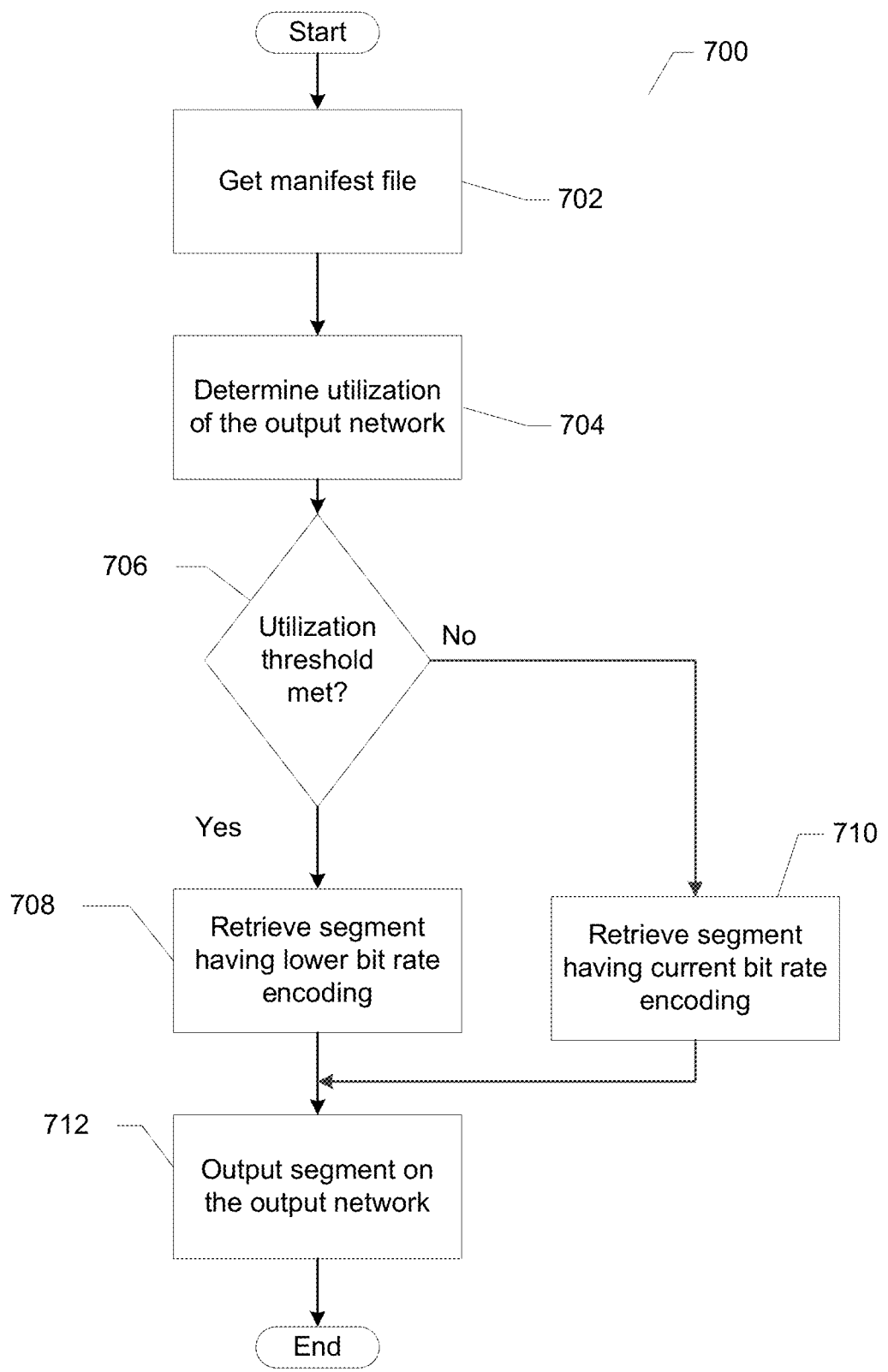

FIG. 7 is an exemplary flow diagram illustrating an example method 700 in accordance with one or more disclosed features described herein. In one or more embodiments, the method illustrated in FIG. 7 and/or one or more steps thereof may be performed by one or more computing devices (e.g., edge gateway 320, and the like). In other embodiments, the method illustrated in FIG. 7 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 702, a manifest file may be retrieved. In some embodiments, a manifest file may be associated with programming content of a channel. In some embodiments, a request may be received to indicate that a particular channel is needed and the manifest file may be retrieved in response to the request. In other embodiments, a configuration file may be accessed to determine that a particular channel is needed and the manifest file may be retrieved in response to the determining.

At step 704, a utilization of an output network may be determined. For example, when the method is implemented in an edge gateway 320, a utilization of the network between the edge gateway and another device, such as an edge device 330 or a home gateway device may be determined.

At step 706, it may be determined whether or not a bandwidth utilization threshold has been reached on the output network. For example, it may be determined whether or not a bandwidth utilization threshold has been reached on a network used for multicast, unicast and/or broadcast communications between an edge gateway 320 and an edge device 330. In some embodiments, it may be determined whether a bandwidth utilization threshold would be reached if a content segment having particular bit rate encoding is transmitted. If it is determined that a bandwidth limitation may exist, the method may continue at step 708 where a lower bit rate encoded segment may be retrieved. If it is determined that a bandwidth limitation does not exist, the method may continue at step 710, where a segment maintaining a current level of bit rate encoding may be retrieved.

At step 712, the segment retrieved in step 708 or step 710 may be output on the output network, for example, streamed via multicast. In various embodiments, the segment retrieved in step 708 or step 710 may be output on the output network via unicast or broadcast.

The above steps may be simultaneously taking place for any number of channels. The method as described above discloses a form of statistical multiplexing where channel segments are selected to maximize use of an output network while providing the highest bit rate encoding in order to maximize quality of content presentation.

Figure 8:
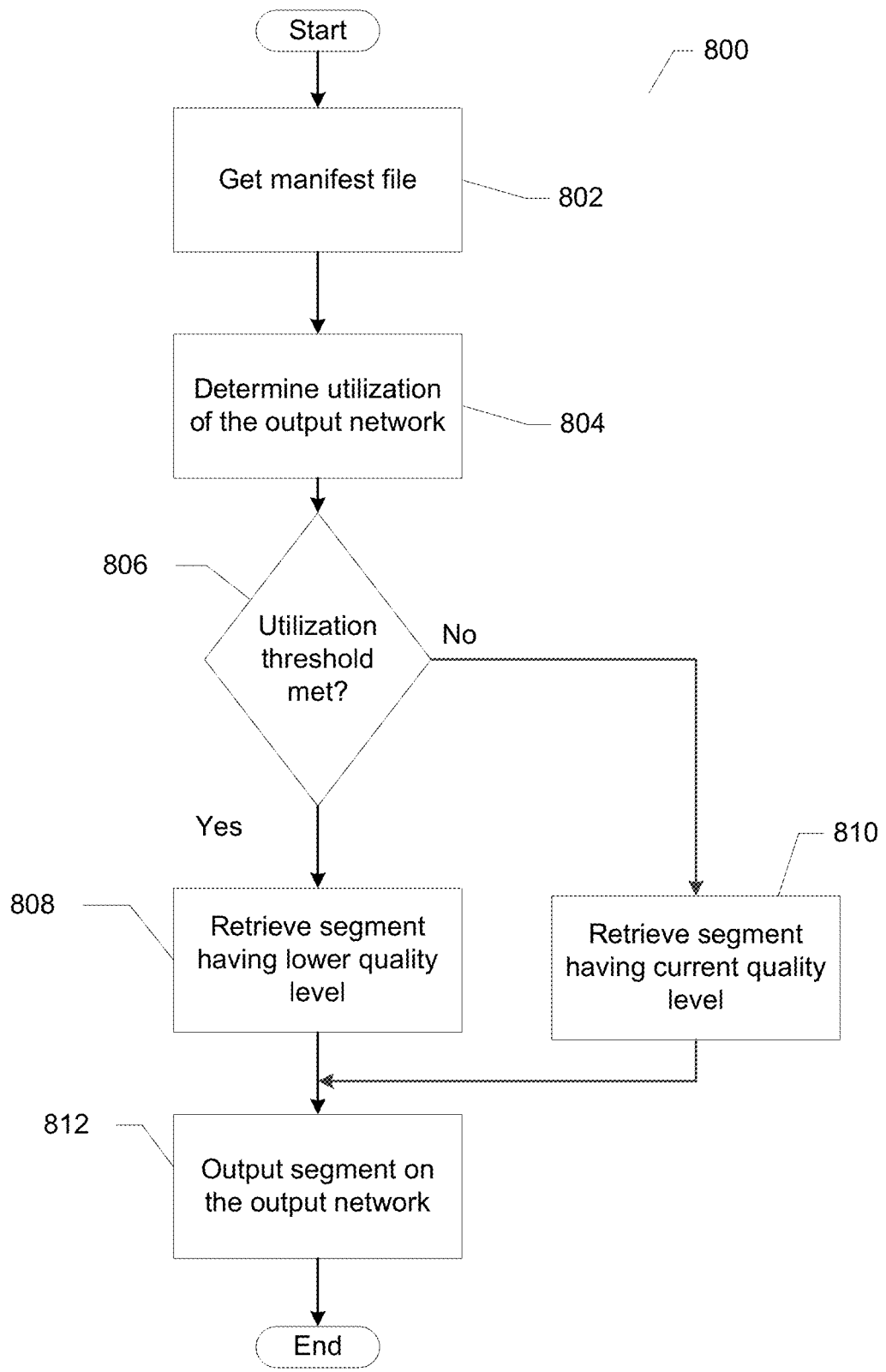

FIG. 8 is an exemplary flow diagram illustrating an example method 800 in accordance with one or more disclosed features described herein. In one or more embodiments, the method illustrated in FIG. 8 and/or one or more steps thereof may be performed by one or more computing devices (e.g., edge gateway 320, and the like). In other embodiments, the method illustrated in FIG. 8 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 802, a manifest file may be retrieved. In some embodiments, a manifest file may be associated with programming content of a channel. In some embodiments, a request may be received to indicate that a particular channel is needed and the manifest file may be retrieved in response to the request. In other embodiments, a configuration file may be accessed to determine that a particular channel is needed and the manifest file may be retrieved in response to the determining.

At step 804, a utilization of an output network may be determined. For example, when the method is implemented in an edge gateway 320, a utilization of the network (e.g. the communication pathway) between the edge gateway 320 and another device, such as an edge device 330 or a home gateway device may be determined.

At step 806, it may be determined whether or not a bandwidth utilization threshold has been reached on the output network. For example, it may be determined whether or not a bandwidth utilization threshold has been reached on a network used for communications between an edge gateway 320 and an edge device 330. If it is determined that a bandwidth limitation may exist, the method may continue at step 808 where a segment having a lower quality may be retrieved. If it is determined that a bandwidth limitation does not exist, the method may continue at step 810, where a segment maintaining a current quality level may be retrieved.

At step 812, the segment retrieved in step 808 or step 810 may be output on the output network, for example, streamed via multicast, unicast or broadcast.

The above steps may be simultaneously taking place for any number of channels. The method as described above discloses a form of ABR multiplexing where channel segments are selected to maximize use of an output network while providing a determined quality of content presentation.

As will be recognized by those skilled in the art, the methods described herein allow several improvements to existing networks supporting distribution of content from channels. For example, a simplified network configuration may be used to deliver VOD and linear channel content. Since advertisement insertion can be done in the edge gateway before the output stream has been multiplexed, the replacement or insertion of advertisements is simplified. In addition, network bandwidth utilization can be maintained below a threshold using the methods disclosed herein.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A method comprising:
    transmitting, by an edge gateway device, a request for a manifest file, wherein the manifest file comprises segment information associated with a plurality of segments of first content, wherein one or more segments of the plurality of segments correspond to a first portion of the first content, and wherein each of the one or more segments of the plurality of segments is encoded at a different bit rate;
    selecting, by the edge gateway device, a first segment of the one or more segments, wherein the selecting is based on:
        a difference between a first complexity of the first portion of the first content and a second complexity of a previous portion of the first content; and
        a difference between a first popularity of the first portion of the first content and a second popularity of the previous portion of the first content;
    retrieving, by the edge gateway device and via a first communication pathway, the selected first segment; and
    transmitting, by the edge gateway device, to an edge device, and via a second communication pathway, the selected first segment.

2. The method of claim 1, wherein the requesting the manifest file is performed after receiving a request for the first content from the edge device or from a gateway interface device.

3. The method of claim 1, further comprising comparing a first quality indicator corresponding to the first portion of the first content to a second quality indicator corresponding to the previous portion of the first content.

4. The method of claim 3, wherein at least one of the first quality indicator or the second quality indicator is based on a bit rate encoding and a scene complexity.

5. The method of claim 1, further comprising:
    requesting a second manifest file, wherein the second manifest file comprises second segment information associated with a plurality of segments of second content;
    determining, based on the second segment information, a second segment among the plurality of segments of second content, wherein the plurality of segments of second content comprises a plurality of media encodings of a first portion of the second content, wherein each of the plurality of media encodings of the first portion of the second content is encoded at a different bit rate;
    retrieving the second segment via the first communication pathway; and
    transmitting, via the second communication pathway, the second segment.

6. The method of claim 5, wherein determining the second segment further comprises determining the second segment based on a network utilization associated with the second communication pathway.

7. The method of claim 6, wherein the network utilization associated with the second communication pathway satisfies a threshold, and wherein determining the second segment further comprises:
    determining that a number of users consuming the second content is less than a number of users consuming the first content; and
    identifying a segment, among the plurality of segments of second content, encoded at a quality level lower than a quality level of the first segment.

8. The method of claim 1, further comprising:
    determining, based on the segment information, an opportunity for segment insertion;
    accessing a second segment for use in segment insertion; and
    transmitting the second segment via the second communication pathway.

9. The method of claim 1, further comprising:
    determining, based on the segment information, that a second segment of the first content comprises a replaceable segment;
    determining a third segment for use as a replacement segment, wherein segment information corresponding to the third segment is not included in the manifest file; and
    transmitting the third segment via the second communication pathway.

10. The method of claim 9, wherein the third segment comprises at least a portion of a local advertisement.

11. The method of claim 1, further comprising determining that the first complexity is higher than the second complexity, and wherein the one or more segments corresponding to the first portion of the first content are encoded at a higher bit rate than a segment corresponding to the previous portion of the first content.

12. The method of claim 1, further comprising determining that the first complexity is lower than the second complexity, and wherein the one or more segments corresponding to the first portion of the first content are encoded at a lower bit rate than a segment corresponding to the previous portion of the first content.

13. The method of claim 1, further comprising determining that the first popularity is higher than the second popularity, and wherein the one or more segments corresponding to the first portion of the first content are encoded at a higher bit rate than a segment corresponding to the previous portion of the first content.

14. A method comprising:
receiving, by a computing device via an access network, a manifest file comprising access information for a first portion of content, wherein the first portion of content is available as a first segment having a first bit rate encoding and as a second segment having a second bit rate encoding;
determining a difference between a first complexity of the first portion of the content and a second complexity of a previous portion of the content;
determining a difference between a first popularity of the first portion of the content and a second popularity of the previous portion of the content;
determining, by the computing device and based on the difference between the complexities and the difference between the popularities, one segment of the first segment and the second segment;
retrieving, by the computing device, the determined one segment; and
transmitting, by the computing device, the determined one segment.

15. The method of claim 14, wherein determining the difference between the first complexity of the first portion of the content and the second complexity of the previous portion of the content comprises determining that the first complexity is lower than the second complexity and wherein the second bit rate encoding is lower than the first bit rate encoding, the method further comprising: determining the one segment to be the second segment.

16. The method of claim 14, wherein the manifest file further comprises a first quality indicator associated with the first segment and a second quality indicator associated with the second segment, wherein determining the difference between the first complexity of the first portion of the content and the second complexity of the previous portion of the content comprises determining that the second quality indicator is associated with a lower quality level than the first quality indicator, the method further comprising:
determining the one segment to be the second segment.

17. The method of claim 16, wherein the first quality indicator is based at least on the first bit rate encoding and a scene complexity associated with the first segment and the second quality indicator is based at least on the second bit rate encoding and a scene complexity associated with the second segment.

18. A method comprising:
receiving, by a computing device via a first network, a manifest file comprising access information for a portion of content, wherein the portion of content is available as a first segment having a first bit rate encoding and as a second segment having a second bit rate encoding, lower than the first bit rate encoding, and wherein the access information comprises an indicator indicative of a first scene complexity of the portion of content;
determining, by the computing device, one segment of the first segment and the second segment, wherein the determining is based on:
a determination that the first scene complexity of the portion of content is different from a second scene complexity of a previous portion of content; and
a determination that a first popularity of the portion of content is different from a second popularity of the previous portion of content;
retrieving, by the computing device, the determined one segment; and
transmitting, by the computing device, the determined one segment via a second network.

19. The method of claim 18, further comprising determining that the first scene complexity of the portion of content is greater than the second scene complexity of the previous portion of content, wherein determining the one segment further comprises determining the one segment to be the first segment.

20. The method of claim 18, further comprising determining that the first scene complexity of the portion of content is lower than the second scene complexity of the previous portion of content, wherein determining the one segment further comprises determining the one segment to be the second segment.

21. The method of claim 18, wherein the determining the one segment further comprises:
after determining that the first scene complexity of the portion of content is greater than the second scene complexity of the previous portion of content and determining that the first popularity associated with the portion of content satisfies a threshold, determining the one segment to be the first segment.

* * * * *